United States Patent
Davis et al.

[15] 3,699,774
[45] Oct. 24, 1972

[54] FLUID SUPPLY SYSTEM

[72] Inventors: Donald Y. Davis; George A. Coffinberry, both of Cincinnati, Ohio

[73] Assignee: General Electric Company

[22] Filed: Sept. 17, 1970

[21] Appl. No.: 73,058

[52] U.S. Cl. .................................60/39.28, 417/426
[51] Int. Cl. ...................................................F02c 9/06
[58] Field of Search .....60/39.28, 243; 417/302, 303, 417/304, 269, 270, 271, 272, 287, 426; 137/110, 114

[56] References Cited

UNITED STATES PATENTS

| | | |
|---|---|---|
| 3,433,016 | 3/1969 | Borel..........................60/39.28 |
| 2,966,210 | 12/1960 | Nordwald....................60/243 |
| 2,989,842 | 6/1961 | Wood......................60/243 X |
| 3,011,308 | 12/1961 | Wotring...................60/243 X |

Primary Examiner—Carlton R. Croyle
Assistant Examiner—Robert E. Garrett
Attorney—Derek P. Lawrence, Erwin F. Berrier, Jr., Lee H. Sachs, Frank L. Neuhauser, Oscar B. Waddell and Joseph B. Forman

[57] ABSTRACT

A wide flow range fluid supply system includes low and high flow range centrifugal pumps connected in parallel between a system outlet and a source of fluid. An outlet check valve and an inlet valve are provided for each pump. Means are provided to recirculate a predetermined portion of the discharge flow from the outlet of the low range pump to enable both pumps to operate during high flow system operation without overheating the low range pump.

10 Claims, 1 Drawing Figure

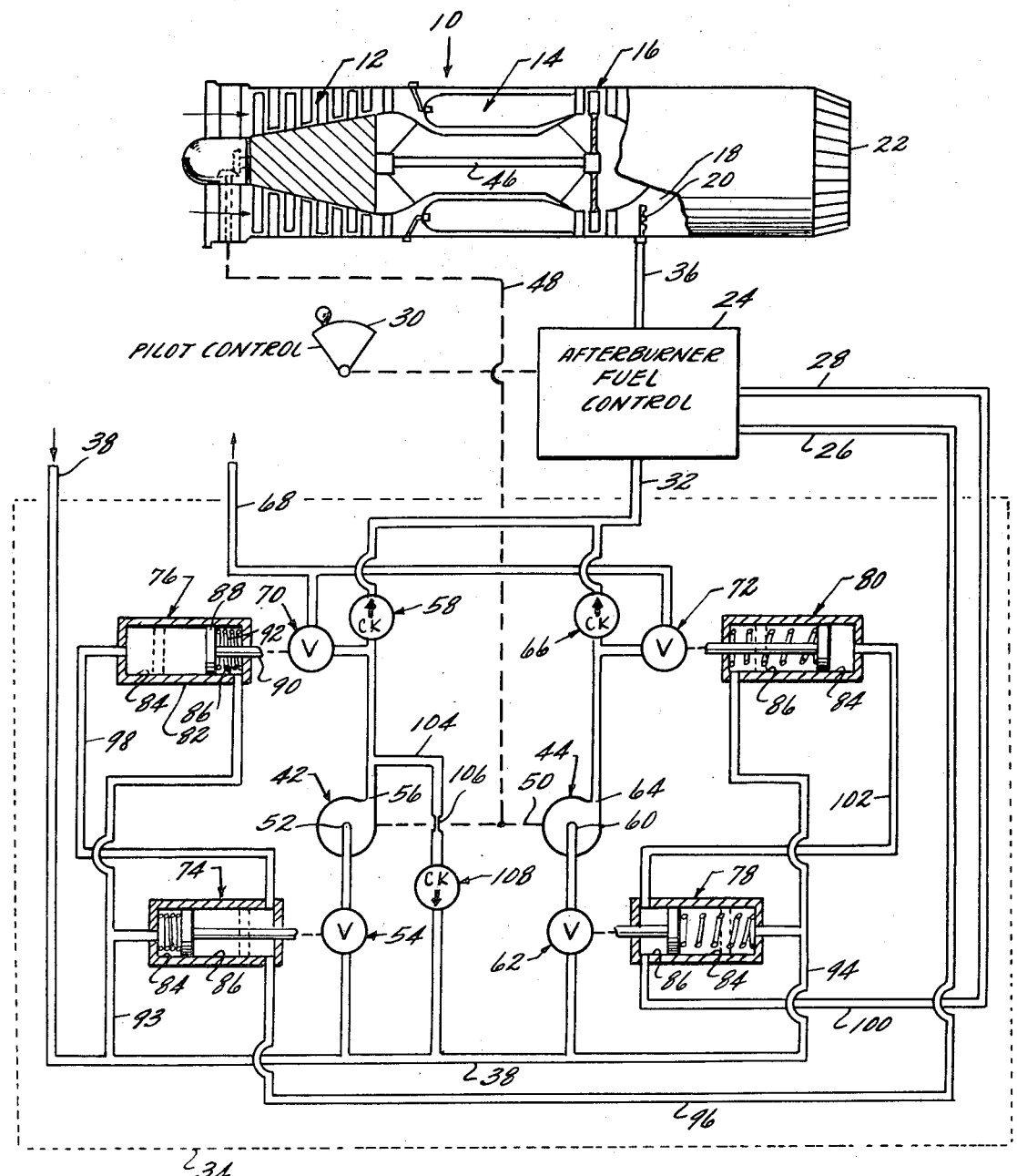

FLUID SUPPLY SYSTEM

This invention relates to fluid supply systems and, more particularly, to a wide flow range, multiple element, centrifugal pump system which has particular utility in afterburner fuel supply systems for aircraft gas turbine engines. The invention herein described was made in the course of or under a contract, or a subcontract thereunder, with the United States Department of the Air Force.

Modern aircraft gas turbine engines may require a wide range of afterburner fuel flow rates to provide the desired thrust throughout the aircraft operating envelope. Such requirement may, for example, call for a variation in fuel flow rates from about 500 lbs. per hour to about 60,000 lbs. per hour or higher. With such high and widely varied afterburner fuel flow requirements, it has been the practice to provide two centrifugal pumps with one pump sized to cover the low head, low flow range and the other pump sized to cover the high head, high flow range. Such systems, however, present a problem in switching from one pump or pumping element to the other while assuring a continuous, uninterrupted flow from the system discharge and while maintaining an acceptable temperature rise in each pump element. One solution to the foregoing problem which has been heretofore proposed includes the provision of a pressure responsive selector valve system which is operative to close the inlet to the low flow pump and open the inlet to the high flow pump when the afterburner flow requirement exceeds a given level. While such selector valve systems generally satisfy the requirements of uninterrupted discharge flow and low pump temperatures, they are generally characterized by being heavy, complex and expensive in nature, which are undesirable characteristics for airborne equipment.

Therefore, a primary object of the present invention is to provide a multielement centrifugal pump system which has a wide flow range; prevents excessive temperatures in each pump element; assures continuous, uninterrupted fluid flow from the system; and is of simplified, lightweight, economical and reliable construction.

A further object of the present invention is to provide a wide flow range gas turbine engine afterburner fuel supply system which employs continuously driven, low and high flow range centrifugal pumps and wherein the inlet valve to each pump is maintained open during high flow system operation without overheating the low flow range pump.

Briefly stated, the above and other objects are achieved in the present invention by providing a low head, low flow range centrifugal pump and a high head, high flow range centrifugal pump which are connected in parallel between a source of pressurized fluid and a discharge conduit from the system. Means for recirculating a predetermined portion of the discharge flow from the low flow range pump to the fluid source are provided and may take the form of a conduit connecting the outlet of the low flow range pump to the fluid source through an orifice sized to establish the predetermined recirculation flow and a check valve to prevent flow directioned from the fluid source to the pump outlet. A suitable actuator-driven valve is provided at the inlet of each pump to selectively open and close communication between the pump inlet and the fluid source. Each pump may be vented at its outlet through an actuator-driven valve which is preferably adapted to open when its corresponding pump inlet valve closes.

While the specification concludes with claims particularly pointing out the subject matter of the present invention, it is believed the invention will be better understood upon reading the following description of the preferred embodiment in conjunction with the accompanying drawing, wherein:

The single figure schematically shows a gas turbine engine employing the fluid supply system of this invention for delivery of fuel to the afterburner of such engine.

With continued reference to the drawing, a gas turbine engine has been shown at 10 as including a compressor 12, a combustor 14, and a turbine 16 arranged in serial flow relation for generating a hot gas stream. The engine 10 further includes an afterburner 18 and suitable spraybars 20 for delivery of fuel thereto when it is desired to increase the energy level of the hot gas stream prior to discharge through the engine nozzle 22. While the engine 10 has been shown as being of the single rotor type, it will be appreciated that it may include a second turbine, downstream of the turbine 16, which is operatively connected to a fan.

An afterburner fuel control has been shown at 24 for generating a low fuel flow pressure signal in conduit 26 and a high fuel flow pressure signal in conduit 28 in response to the setting of a pilot control or throttle 30. In accordance with the present invention, fluid supply means 34 are provided for delivery of fuel to the fuel control 24, through conduit 32, in response to the low and high signals of conduits 26 and 28. Such fuel is, in turn, delivered to the fuel spray means 20 through conduit 36.

The fluid supply means 34 has been shown as including an inlet conduit 38 which delivers fuel from a suitable source to a first or low head, low flow range centrifugal pump 42 and a second or high head, high flow range centrifugal pump 44. The rotor elements of the pumps 42, 44 are operatively connected to the engine rotor 46 through a suitable drive connection 48 and a common shaft 50 so as to preferably be continuously driven during engine operation. The inlet 52 to the low flow range pump 42 is connected to the inlet fuel conduit 38 through suitable inlet valve means 54 while its outlet 56 is connected to the outlet conduit 32 through suitable check valve 58 which is operative to prevent fuel flow directioned from conduit 32 to pump 42.

In like manner, the inlet 60 of the high flow range pump 44 is connected to inlet conduit 38 through suitable inlet valve means 62 and its outlet 64 is connected to the outlet conduit 32 through suitable check valve 66 which is operative to prevent fuel flow directioned from conduit 32 to pump 44. The outlet of each pump 42, 44 is additionally connected to a vent conduit 68 through suitable vent valve means 70 and 72, respectively. Suitable valve actuator means have been shown at 74, 76, 78 and 80 to control, respectively, the valve means 54, 70, 62 and 72. The valve actuator means have been shown as being of the fluid pressure responsive type, with each actuator including a housing 82 which defines chambers 84 and 86 on opposite sides of a piston 88. Each piston 88 is operatively connected to its respective valve means through a rod 90. The pistons 88 of each actuator 74, 78 is yieldingly urged to its valve closing position by biasing means 92, while in the case of actuators 76 and 80, such biasing means urges the piston to its valve opening position.

Pressurized fuel from the inlet conduit 38 is directed to the chambers 86, of vent valve actuators 76 and 80, and to the chambers 84, of inlet valve actuators 74 and 78, through suitable conduits 93 and 94. The low flow rate signal of fuel control 24 is directed to the chamber 86, of the inlet valve actuator 74, and to the chamber 84, of the vent valve actuator 76, through conduits 26, 96 and 98. In like manner, the fuel control high flow rate signal is communicated with the chamber 86, of inlet valve actuator 78, and the chamber 84, of vent valve actuator 80, through conduits 28, 100, and 102.

In accordance with a primary aspect of the present invention, means for recirculating a predetermined portion of the discharge flow from the first pump 42 are provided which, in the depicted embodiment, take the form of a conduit 104 connected between the first pump outlet 56 and the inlet conduit 38. The conduit 104 includes an orifice 106, which is sized to establish a predetermined fuel flow rate thereacross, and a check valve 108 operative to prevent fuel flow directioned from the inlet conduit 38 to the pump outlet 56.

During unaugmented operation of the gas turbine engine 10, the fluid pressure within conduits 26 and 28 is relieved by the afterburner fuel control 24 and the fluid pressure within inlet conduit 38 together with biasing means 92 urges the pistons 88 of actuators 74 and 78 to a position closing, respectively, the inlet valve means 54 and 62.

In order to prevent overheating when inlet valve means 54 and 62 are closed, the pumps are vented through conduit 68 and vent valve means 70 and 72, with such valves being maintained in their open position through the action of biasing means 92 and the fuel pressure of inlet conduit 38 in the chambers 86 of actuators 76 and 80.

When the pilot control lever 30 is moved to a position calling for delivery of a relatively low fuel flow rate to the afterburner 18, as for example 500 lbs. per hour, a suitable fluid pressure signal is generated by the afterburner fuel control 24 and directed to the chamber 86 of actuator 74 and the chamber 84 of actuator 76 by way of conduits 26, 96, and 98, whereupon the actuator 74 opens inlet valve 54 and actuator 76 closes vent valve 70. Since the first pump 42 is continuously driven through drive connection 48, 50, upon opening inlet valve 54 the required fuel is delivered through check valve 58 and conduit 32 to the afterburner fuel control 24. At the same time, a predetermined portion of the fuel discharged through first pump outlet 56 returns to the inlet conduit 38 through conduit 104, orifice 106, and check valve 108.

As the pilot control or throttle lever 30 is further advanced, calling for greater thrust and, hence, a higher afterburner fuel flow rate, a high flow rate pressure signal is generated by afterburner fuel control 24 and transmitted to the chamber 86 of actuator 78 and the chamber 84 of actuator 80 through conduits 28, 100 and 102, whereupon the piston 88 of actuator 78 is urged against biasing means 92 to a position opening inlet valve 62 and the piston 88 of actuator 80 is urged to a position closing the vent valve 72. When the discharge pressure of pump 44 exceeds that of pump 42, check valve 66 opens, check valve 58 closes and the fuel requirements of the fuel control 24 are provided by the second pump 44. The orifice 106 is sized so that when the check valve means 58 and vent valve means 70 are closed, the fuel flow rate through the first pump 42 is sufficient to prevent overheating. For example, it has been found that with the first pump sized to deliver up to approximately 10,000 lbs. of fuel per hour, an orifice 106 sized to establish a recirculation flow rate of 600 lbs. provides satisfactory operation. During low fuel flow operation, check valve 66 prevents fuel flow from pump 42 to pump 44. In like manner, during high fuel flow operation, check valve 58 prevents fuel flow from pump 44 to pump 42.

When the pilot control lever 30 is returned to its unaugmented position, the sequential operation described above is reversed.

From the foregoing it will be appreciated that by providing the recirculation means of this invention, a smooth transition is effected between the low and high fuel flow requirements of the afterburner fuel control 24 without overheating the first pump 42 and without breaking the drive connection to the first pump or closing the inlet valve means 54.

While the fluid supply means 34 have been depicted and described as including two centrifugal pumps, it will be appreciated that more than two pumps may be utilized if a wider range of flow rates is desired. In addition, while the afterburner fuel control 24 has been described as being of the type adapted to generate a low and high flow fluid pressure signal, with the actuator means 74, 76, 78 and 80 being of the fluid pressure responsive type, it will be appreciated that a mechanical or electrical signal may be used and that solenoids or other suitable means may be substituted for the fluid pressure responsive actuators. Accordingly, it should be understood that while one embodiment of the fluid supply means 34 has been depicted and described, such is intended to be exemplary only and not definitive and that many modifications, substitutions and changes may be made thereto without departing from the fundamental theme of the invention.

What is claimed is:

1. A system for delivery of fuel over a wide range of flow rates to the afterburner of a gas turbine engine, said system comprising: a first centrifugal pump sized to deliver fuel over a lower portion of said flow range, a second centrifugal pump sized to deliver fuel over the remaining higher portion of said flow range, an inlet conduit connected to a source of fuel, a discharge conduit, the outlet of each pump connected to said discharge conduit through a check valve operative to prevent flow directioned from said discharge conduit to said pumps, means for connecting the inlet of said first pump to said inlet conduit in response to afterburner fuel flow requirements in said lower portion of said flow range, for maintaining the connection of the inlet of said first pump to said inlet conduit in response to requirements in said higher portion of said flow range, and for additionally connecting the inlet of said second pump to said inlet conduit in response to afterburner fuel flow requirements in said higher portion of said flow range, and means for recirculating a predetermined portion of the discharge flow from said first pump during said higher portion flow range operation of both pumps so as to prevent excessive temperatures in said first pump, whereby both pumps may be operated when said afterburner requirements are in said higher portion of said flow range to provide a smooth transition between said low and high flow range portions.

2. The structure of claim 1 further characterized in that said recirculating means includes a recirculation conduit connecting the outlet of said first pump to said inlet conduit through a check valve operative to prevent fluid flow directional from said inlet conduit to said first pump, said recirculation conduit including an orifice sized to establish said predetermined recirculation rate of flow.

3. The structure of claim 1 further characterized by and including means for draining each said pump when its inlet is not connected with said inlet conduit.

4. The structure of claim 3 further characterized in that said draining means comprise a vent conduit and means for selectively connecting the outlet of each said pump to said vent conduit.

5. The structure of claim 1 further characterized in that said engine includes afterburner fuel control means for generating a first and a second signal, respectively, in response to afterburner fuel flow requirements within said lower portion of said fuel flow range and afterburner fuel flow requirements within the remaining portion of said fuel flow range, said means for selectively connecting the inlets of said pumps to said inlet conduit comprising a valve for each said pump inlet and first and second actuator means for moving, respectively, the inlet valve for said first pump and the inlet valve for said second pump from a closed position to an open position in response, respectively, to said first signal and said second signal.

6. The structure of claim 5 further characterized by and including a vent conduit, a vent valve connecting the outlet of each said pumps with said vent conduit, and third and fourth actuator means for moving, respectively, the vent valve for said first pump and the vent valve for said second pump from an open position to a closed position in response, respectively, to said first signal and said second signal.

7. The structure of claim 5 further characterized in that said actuator means are fluid pressure responsive.

8. A system for delivery of fuel over a wide range of flow rates comprising,
a plurality of centrifugal pumps of increasing capacity, each said pump having an inlet and an outlet,
an inlet conduit for connecting said system with a source of pressurized fuel,
a discharge conduit for delivery of fluid from said system,
each said pump having its outlet connected to said discharge conduit through a check valve operative to prevent flow directioned from said discharge conduit to said pump,
means for connecting the inlet of the lowest capacity pump to said inlet conduit, for maintaining the connection of the inlet of the lowest capacity pump to said inlet conduit in response to requirements in said higher portion of said flow range, and for additionally connecting the inlets of the remaining pumps in sequence of their capacity in response to increased fluid flow requirements, and
means for recirculating a predetermined portion of the discharge fluid flow from each lower capacity pump as each higher capacity pump is connected to said inlet so as to prevent excessive temperatures in said lower capacity pumps, whereby all pumps may be operated simultaneously so as to provide a smooth transition in fluid flow throughout the flow range of the system.

9. The fluid delivery system of claim 8 further characterized in that there are two pumps, said recirculating means comprising a conduit connected from said lower capacity pump outlet to said inlet conduit through an orifice sized to establish said predetermined flow portion and a check valve operative to prevent flow directioned from said inlet conduit to said lower capacity pump outlet.

10. The fluid delivery system of claim 8 further characterized by and including a vent conduit and means for connecting the outlet of each pump with said vent conduit when each respective pump's inlet is disconnected from said inlet conduit.

* * * * *